United States Patent [19]

Sistare et al.

[11] Patent Number: 5,355,494
[45] Date of Patent: Oct. 11, 1994

[54] COMPILER FOR PERFORMING INCREMENTAL LIVE VARIABLE ANALYSIS FOR DATA-PARALLEL PROGRAMS

[75] Inventors: Steven J. Sistare, Somerville; James L. Frankel, Lexington, both of Mass.

[73] Assignee: Thinking Machines Corporation, Cambridge, Mass.

[21] Appl. No.: 806,026

[22] Filed: Dec. 12, 1991

[51] Int. Cl.$^5$ .............................................. G06F 9/44
[52] U.S. Cl. ............................. 395/700; 364/DIG. 1;
364/280.4; 364/280.5; 364/280; 364/262.4
[58] Field of Search ................. 395/700, 650; 364/200

[56] References Cited

U.S. PATENT DOCUMENTS

| | | |
|---|---|---|
| 4,598,400 | 7/1986 | Hillis . |
| 4,773,038 | 9/1988 | Hillis et al. . |
| 4,827,403 | 5/1989 | Steele, Jr. et al. . |
| 4,984,235 | 1/1991 | Hillis et al. . |
| 5,021,945 | 6/1991 | Morrison et al. .................... 364/200 |
| 5,107,418 | 4/1992 | Cramer et al. ....................... 395/700 |
| 5,175,856 | 12/1992 | Van Dyke et al. .................. 395/700 |
| 5,179,702 | 1/1993 | Spix et al. ............................ 395/650 |
| 5,193,190 | 3/1993 | Janczyn et al. ...................... 395/700 |
| 5,204,960 | 4/1993 | Smith et al. .......................... 395/700 |

OTHER PUBLICATIONS

C* Programming Guide, Version 6.0, Thinking Machines Corporation, Cambridge, Mass., Nov. 1990.
John Rose et al., "C*: An Extended Language for Data Parallel Programming", TMC Technical Report Series, PL87-5, (Apr. 1987) (Presented at Second International Conference on Supercomputing, May 1987).
Alfred Aho et al., *Compilers, Principles, Techniques and Tools*, pp. 534, 535, 598–600, 631 and 632, (1988).

*Primary Examiner*—Kevin A. Kriess
*Attorney, Agent, or Firm*—Sterne, Kessler, Goldstein & Fox

[57] ABSTRACT

A compiler for compiling a computer program wherein the computer program is adapted for use with a data parallel computer. The compiler comprises an optimizer which optimizes the compiled code. In optimizing the compiled code, the optimizer performs live variable analysis. With regard to performing live variable analysis, the optimizer of the present invention is adapted for use with data parallel languages. Additionally, the optimizer is computationally efficient at compile time. Further, the optimizer operates in an incremental manner.

28 Claims, 12 Drawing Sheets

COMPILER FOR PERFORMING INCREMENTAL LIVE VARIABLE ANALYSIS FOR DATA-PARALLEL PROGRAMS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS-REFERENCE TO OTHER APPLICATIONS

The following applications are assigned to the assignee of the present application:

U.S. patent application Ser. No. 07/042,761, filed Apr. 27, 1987, by W. Daniel Hillis, now U.S. Pat. No. 5,050,069, entitled "Method and Apparatus for Simulating M-Dimensional Connection Networks in an N-Dimensional Network Where M is Less Than N", incorporated herein by reference.

U.S. patent application Ser. No. 07/788,052, filed Nov. 5, 1991, by Frankel et al., entitled "A Compiler For Parallel Communication Instructions", incorporated herein by reference.

U.S. patent application Ser. No. 07/788,004, filed Nov. 5, 1991, by Frankel et al., entitled "System and Method For Parallel Variable Optimization", incorporated herein by reference.

U.S. patent application Ser. No. 07/788,003, filed Nov. 5, 1991, by Frankel et al., entitled "System and Method For Shape Selection and Contextualization", incorporated herein by reference.

INCORPORATION BY REFERENCE

U.S. Pat. 4,589,400, issued Jul. 1, 1986, to W. Daniel Hillis, for "Method and Apparatus for Routing Message Packets", and assigned to the assignee of the present application, incorporated herein by reference.

U.S. Pat. 4,984,235, issued Jan. 8, 1991, to Hillis et al., for "Method and Apparatus for Routing Message Packets and Recording the Routing Sequence", and assigned to the assignee of the present application, incorporated herein by reference.

BACKGROUND OF THE INVENTION

1. Field of the Invention

The present invention relates generally to a system and method for compiling a computer program, and more particularly to a system and method for compiling a computer program wherein the computer program is adapted for use with a data parallel computer.

2. Related Art

Optimization of computer code generated by a compiler often requires that live variable analysis be performed. This analysis yields the range of program locations within which each variable is said to be live. A variable is alive at a program location if the value stored in the variable is needed later and cannot be altered.

The information produced by live variable analysis can be used in a number of ways to optimize a program. For example, if two variables have live ranges that do not overlap, then these variables may share the same storage location in the primary memory of the target computer system. As a second example, if a computer instruction stores its result in a variable which has been determined to be dead at that point, then the result of the instruction is never used later, and the instruction may be deleted from the program. This is conventionally called dead code elimination. Thus, the use of live variable information can result in both space and time improvements to a program.

Methods for conducting live variable analysis are well known. For example, a conventional method for live variable analysis is described in *Compilers, Principles, Techniques, and Tools* by Aho et al. However, such conventional methods are flawed for a number of reasons. For example, conventional methods for live variable analysis are not adapted for use with data parallel languages. Also, conventional methods for live variable analysis are computationally expensive at compile time.

Therefore, an efficient method for live variable analysis for use with data parallel languages is required.

SUMMARY OF THE INVENTION

The present invention is directed to a system and method for compiling a computer program, and more particularly to a compiler for compiling a computer program wherein the computer program is adapted for use with a data parallel computer. The compiler comprises an optimizer which optimizes the compiled code. In optimizing the compiled code, the optimizer performs live variable analysis.

With regard to performing live variable analysis, the optimizer of the present invention is adapted for use with data parallel languages. Additionally, the optimizer is computationally efficient at compile time. Further, the optimizer operates in an incremental manner.

The optimizer includes an incremental live variable analysis component. According to the present invention, the incremental live variable analysis component performs the incremental live variable analysis. The incremental live variable analysis component includes a definition/use module, a reaching definitions module, a live variable module, and a live variable traversal module. The incremental live variable analysis component operates generally as follows.

First, the def/use module receives unoptimized IR code and generates a definition set (referred to as defset) and a usages set (referred to as useset) for each basic block contained in the unoptimized IR code. Then, the reaching definitions module receives the unoptimized IR code and the defsets and usesets and generates, for each basic block, a reach in set and a reach out set. Then, the live variable module receives the defsets, usesets, reach in sets, and reach out sets and generates, for each basic block, a live in set and a live out set. Finally, the live variable traversal module receives the unoptimized IR code and the live out sets and determines which variables are live at each node of each basic block.

Further features and advantages of the present invention, as well as the structure and operation of various embodiments of the present invention, are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTIONS OF THE DRAWINGS

The present invention will be described with reference to the accompanying drawings, wherein.

DETAILED DESCRIPTION OF THE PREFERRED EMBODIMENTS

1. Hardware and Software Environment of the Present Invention

The present invention is directed to a software compiler for compiling a computer program wherein the computer program is adapted for use with a data parallel computer. In this patent document, the terms "computer program" and "source code" are used interchangeably.

In a preferred environment of the present invention, the data parallel computer is one manufactured by Thinking Machines Corporation, such as the Connection Machine® Model CM1™, CM2™ and CM5™ Supercomputers. These and other preferred environments of the present invention are described in U.S. Pat. No. 4,589,400 to Hillis, U.S. Pat. No. 4,984,235 to Hillis et al., and U.S. patent application Ser. No. 07/042,761, entitled "Method and Apparatus for Simulating M-Dimensional Connection Networks in an N-Dimensional Network Where M is Less Than N", filed Apr. 27, 1987, by Hillis, all of which were cited above.

Specifically, U.S. Pat. No. 4,589,400 describes a massively-parallel computer, including one embodiment of processors and router, with which the present invention can be used. U.S. Pat. No. 4,984,235 describes a massively-parallel computer, including a second embodiment of processors. U.S. patent application Ser. No. 07/042,761, entitled "Method and Apparatus for Simulating M-Dimensional Connection Networks in an N-Dimensional Network Where M is Less Than N", describes, in a massively parallel computer including processor chips interconnected by a hypercube, an arrangement for emulating the 2-, 3-, or higher dimensional nearest-neighbor communication network ("NEWS") between chips using the hypercube wires.

The computer program is written in a high level language (HLL). A preferred HLL is C* (pronounced "see star"). C* is based on Standard C and is extended to support parallel instructions and parallel data types. The C* language is described in the Thinking Machines Corporation publication C* Programming Guide (Version 6.0, November 1990) which is herein incorporated by reference in its entirety. The C* language is further described in the Thinking Machines Corporation publication C* Language Reference Manual (April 1991) which is herein incorporated by reference in its entirety.

Figure 1A:
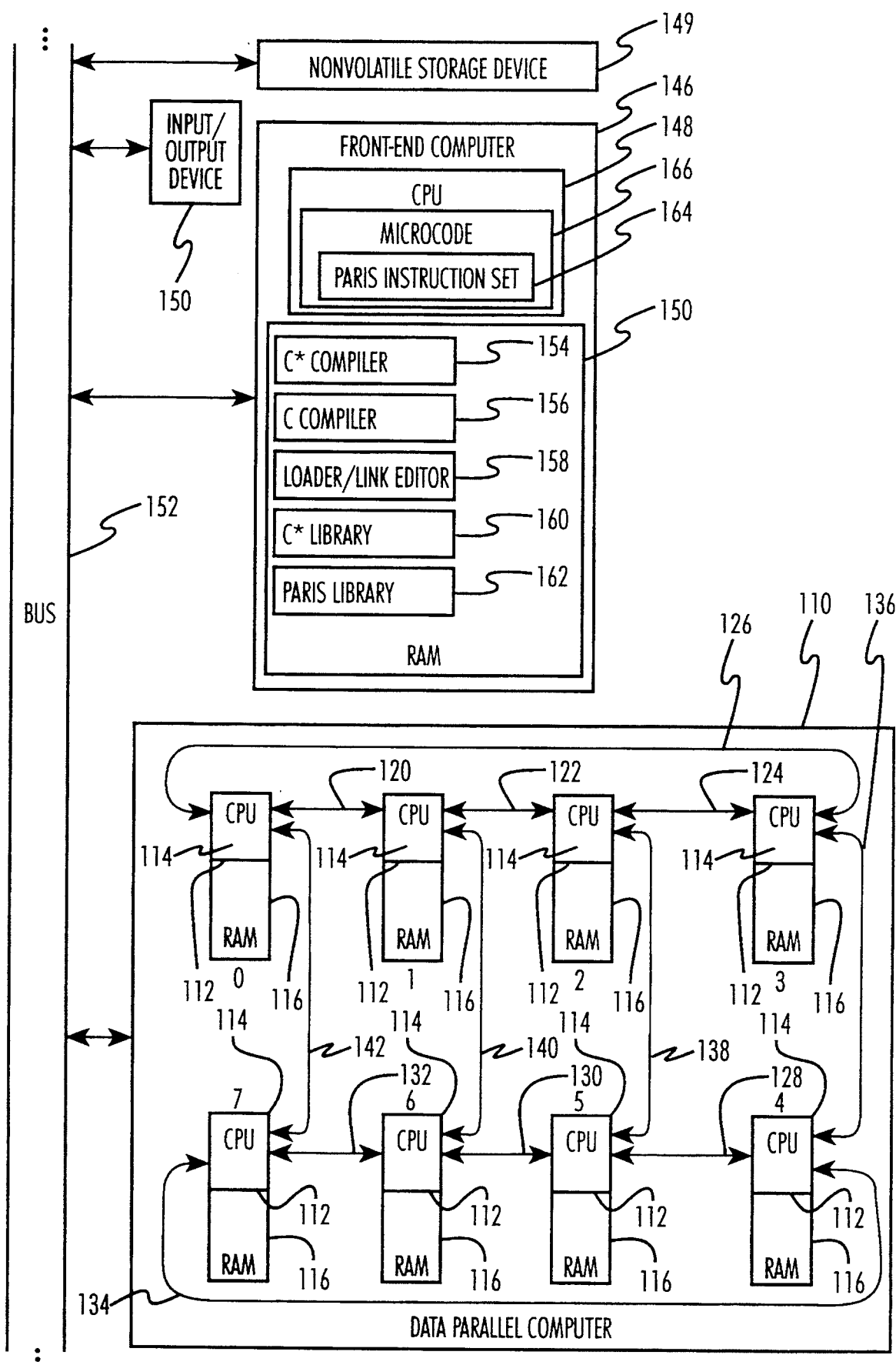
FIG. 1A shows a block diagram of the structure of a preferred environment in which the present invention could operate.

FIG. 1A shows a block diagram of the structure of a preferred environment in which the present invention could operate. A data parallel computer 110 is comprised of a plurality of parallel processors 112. The number of processors in an actual data parallel computer 110 might range from 2,048 to 65,536. For clarity, the data parallel computer 110 illustrated has only eight parallel processors 112 (parallel processor$_0$ to parallel processor$_7$). Each parallel processor 112 has a CPU 114 and a random access memory (RAM) 116.

Each of the parallel processors 112 is directly connected to three other parallel processors 112 by paths. For example, the parallel processor$_0$ 112 is directly connected to the parallel processor$_1$ 112 via a path 120, the processor$_3$ 112 via a path 126, and the parallel processor$_7$ 112 via a path 142. The direct connections are such that no more than two paths need be used to send data between nearest-neighbor parallel processors 112.

The data parallel computer 110 is electrically connected to a host computer 146, to a non-volatile storage device 149, and to an input/output device 150 via a bus 152.

The host computer 146 is a serial computer such as a Sun 4 (manufactured by Sun Microsystems, Inc.) or a VAX (manufactured by Digital Equipment Corp.). The host computer 146 comprises a single host CPU (or a small number of CPUs) 148 and a RAM 150.

The environment of the present invention further includes various software modules and a firmware module. The software components include a C compiler 156, a loader/link editor 158, a C* library 160, and a Paris library 162. The software modules could reside in the RAM 150, in the non-volatile storage device 149, or in some combination of the two. In FIG. 1A, the software modules are shown in the RAM 150. The firmware module (a Paris instruction set 164) resides in a microcode 166 of the host CPU 148.

A C* compiler 154 of the present invention is also included in the RAM 150. An example of the C* compiler 154 is the Thinking Machines Corporation C* Compiler. Version 6.0.

As noted above, C* is an extension of Standard C in that C* supports parallel instructions and parallel data types. Such extension of Standard C is achieved via use of a native instruction set of the data parallel computer. One such native instruction set is a Paris language. The Paris language is a low-level instruction set for programming the data parallel computer. The Paris language is described in the Thinking Machines Corporation documents Paris Reference Manual (Version 6.0, February 1991) and Revised Paris Release Notes (Version 6.0, February 1991), which are herein incorporated by reference in their entireties. These documents are available from the Thinking Machines Corporation Customer Support Department at 245 First Street, Cambridge, Mass.

The Paris instruction set 164 and the Paris library 162 implement the Paris language. The Paris instruction set 164 and the Paris library 162 are part of the system software for the Connection Machine ® Model CM2 ® Supercomputer.

Figure 2:
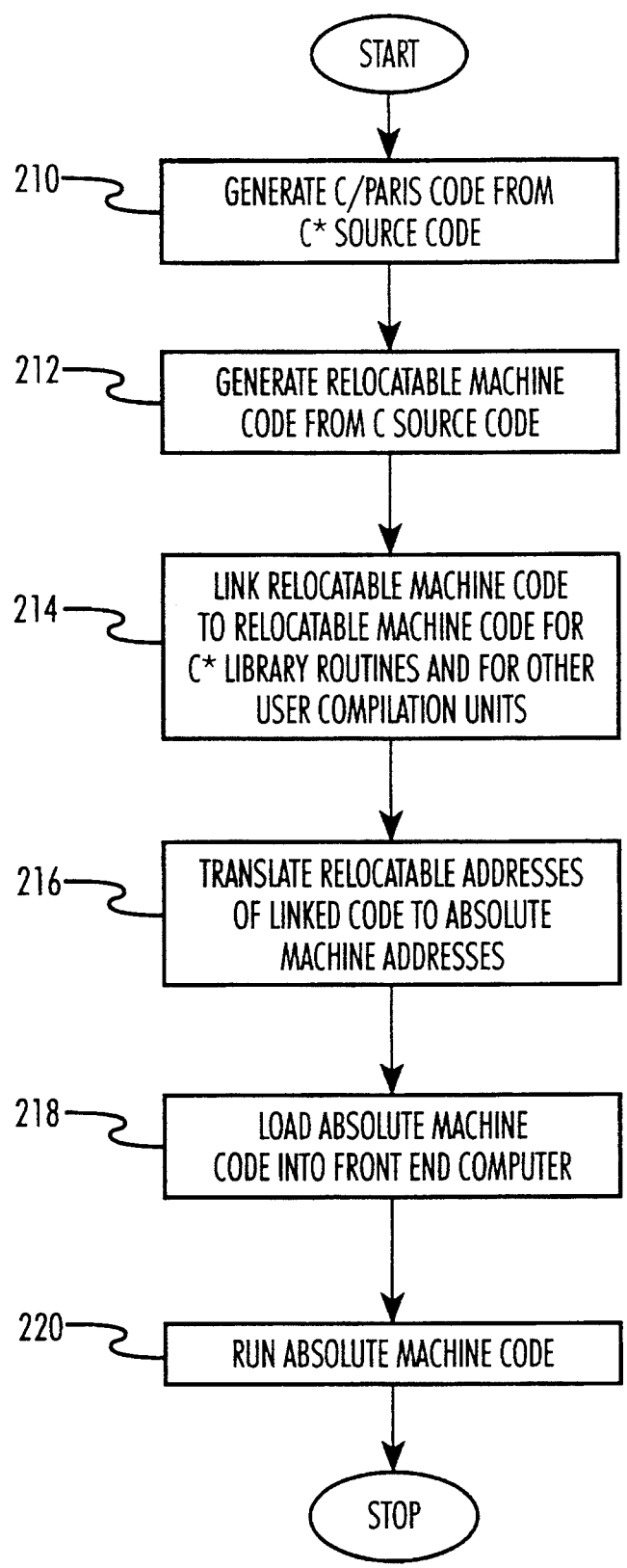
FIG. 2 is a flow chart which illustrates the relationship between firmware and software modules of FIG. 1A.

FIG. 2 is a flow chart which illustrates the relationship between the software modules 154, 156, 158, 160 and 162 and the firmware module 164 of FIG. 1A. Referring to FIG. 2, in a step 210 the C* compiler 154 generates C source code from C* source code. In a step 212, the C compiler 156 generates relocatable machine code from the C source code. In a step 214, the loader/link editor 158 links the relocatable machine code to user compilation units and to compilation units of the C* library 160 and the Paris library 162 to generate linked machine code. Steps 216, 218, and 220 involve executing the linked code. Specifically, in step 216, the relocatable addresses of the linked code are translated to absolute machine addresses. In step 218, the absolute machine code is loaded into the front end computer 146. In step 220, the absolute machine code is executed.

2. Selected Aspects of the C* Programming Language

C* uses shapes and parallel variables to extend C to support data parallel programming.

A shape is a template for parallel data. In C*, a programmer must specify the shape of the data before the programmer can define data of that shape. A shape is specified by how many dimensions it has and by the number of positions in each of its dimensions. The total number of positions in a shape is product of the number of positions in each of its dimensions. For example, an 8×4 shape has 32 positions.

A C* keyword "shape" is used to declare shapes. This is shown in Example 1, below.

---
shape [8]employees;          (Example 1)
shape [16]companies;
---

The statements in Example 1 declare a shape called employees and a shape called companies. The employees shape has one dimension (a rank of 1) and 8 positions. The companies shape has one dimension and 16 positions. A dimension is also referred to as an axis. A shape can have multiple axes. Each of the axes are specified in a set of brackets to the left of the shape name. For example, the following statement in Example 2 declares a two-dimensional shape:

---
shape [256][512]image;       (Example 2)
---

The statement in Example 2 declares a shape called image. The shape image has two dimensions (a rank of 2), one of 256 positions and another of 512 positions. The left-most axis is referred to as axis 0. The next axis to the right is referred to as axis 1.

Parallel variables are similar to standard C variables. However, parallel variables have a shape in addition to their data type and storage classes. The shape defines how many elements of a parallel variable exists, and how they are organized. Each element occupies one position within the shape and contains a single value. If a shape has 16384 positions, for example, a parallel variable of that shape has 16384 elements—one for each position.

---
Parallel variables are declared as shown in Example 3.

double:employees employee_id;    (Example 3)
char:companies company_id;
---

In Example 3, employee_id is declared as a parallel variable having shape employees and type double company_id is declared as a parallel variable having shape companies and type character.

Each element of a parallel variable can be thought of as a single scalar variable. But a C* program can also carry out operations on all elements (or any subset of the elements) of a parallel variable at the same time. Operations which operate on parallel variables are called parallel operations.

Once a parallel variable has been declared, left indexing may be used to specify an individual element of it. For example, [2]employee_id refers to the third element of employee_id. [2] is called the coordinate for this element.

Figure 1B:
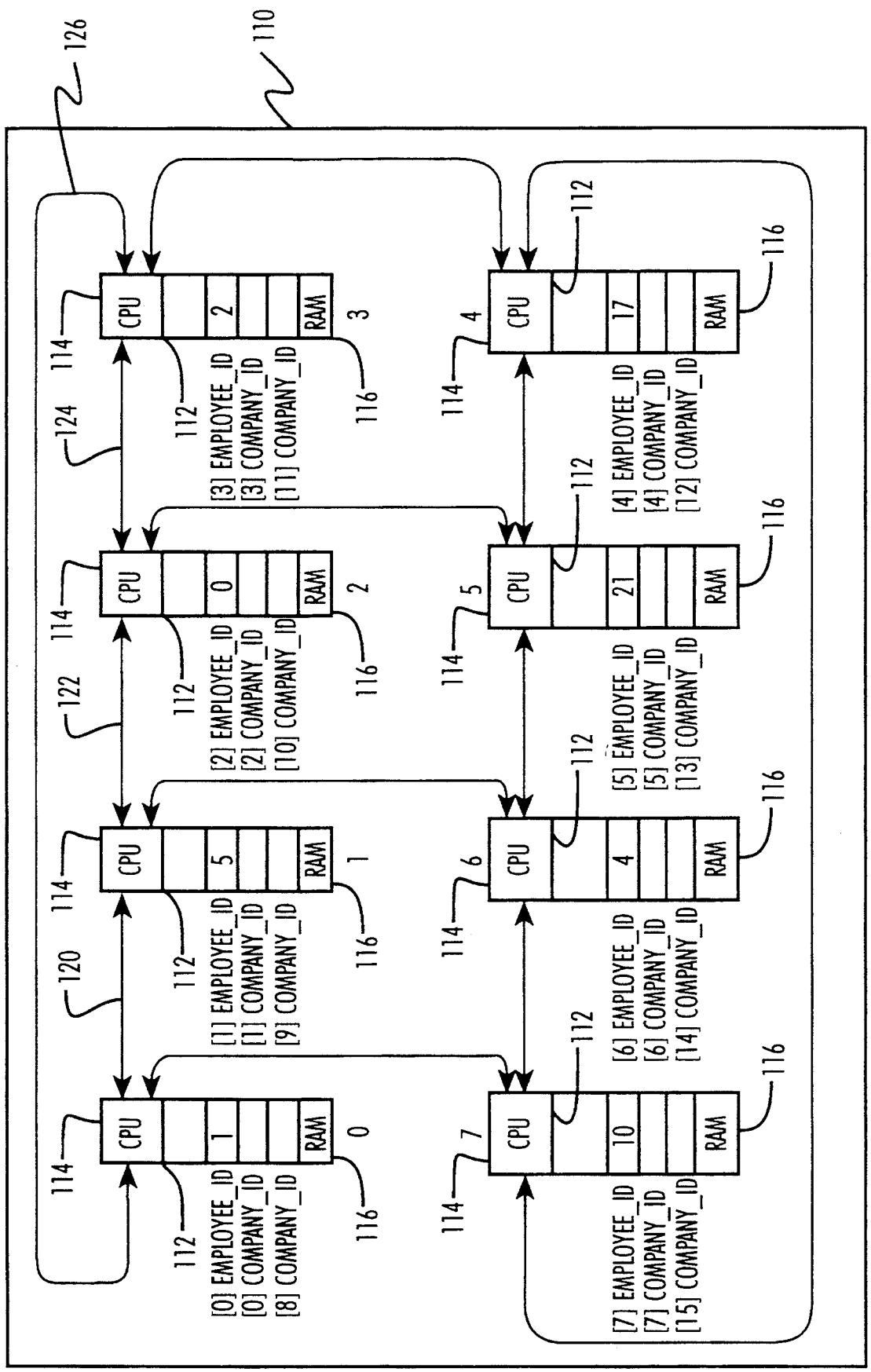
FIG. 1B illustrates a data parallel computer.

Elements of parallel variables are mapped to physical processors. This is illustrated in FIG. 1B. FIG. 1B illustrates the data parallel computer 110 in greater detail.

As shown in FIG. 1B, the first element of employee_id is mapped to the processor 0. The second element of employee_id is mapped to the processor 1. Similarly, the third, fourth, fifth, sixth, seventh, and eight elements of employee_id are mapped to the processors 2, 3, 4, 5, 6 and 7, respectively.

In a similar manner, the elements of the parallel variable company_id are mapped to the processors 0-7. With regard to parallel variables of shape companies, note that each element does not map to a different physical processor. For example, both elements [0]company_id and [8]company_id map to physical processor 0. However, according to C*, all elements map to different virtual processors. Thus, for particular shapes, each physical processor may represent multiple virtual processors. For the shape companies, the number of virtual processors per physical processor is 2. For the shape employees, the number of virtual processors per physical processor is 1. This is called the virtual processor (VP) ratio.

Before a parallel operation may be executed on a parallel variable, the current shape must be set to the shape of the parallel variable. The current shape may be set by using the C* "with" statement. For example, to operate with parallel variables of shape employees (such as employee_id), the C* statements in Code Segment 1 may be used.

---
with(employees) {
   /* operations on parallel variables of
   shape employees go here */
};
Code Segment 1
---

Within the "with" statement of Code Segment 1, parallel operations may be performed on parallel variables of shape employees. However, parallel operations may not be performed on parallel variables (such as company_id), having other shapes (such as companies).

According to C*, parallel operations may be performed on a subset of the elements of a parallel variable. This is done using the C* "where" statement. The "where" statement restricts the context in which parallel operations are performed. A "where" statement specifies which positions in a shape remain active. Code in the body of a "where" statement applies only on elements in active positions.

For example, the C* statements in Code Segment 2, below, restrict parallel operations to positions of shape employees where the value of the parallel variable employee_id is greater than 6.

```
with(employees)
   where (employee_id > 6)
      /* parallel code in restricted content
      goes here */
Code Segment 2
```

The controlling expression that "where" evaluates to set the context must operate on a parallel variable of the current shape. The controlling expression evaluates to 0 (false) or non-zero (true) separately for each position. Positions in which the expression is false are made inactive. If no positions are active, code is still executed, but operations on the parallel variable of the current shape has no result. Initially, operations in all positions are active.

Referring to FIG. 1B, for example, the "where" statement is Code Segment 2 evaluates to true for the employee_id elements in processors 4, 5 and 7. Therefore, as a result of the "where" statement in Code Segment 2, the employee_id elements in processors 4, 5 and 7 are active. The use of the "where" statement to make certain positions of a shape inactive and other positions of the shape active is called context manipulation.

C* supports promotion of scalar values to parallel variables. According to C*, programmers can use standard C binary operations when one of the operands is parallel and the other is scalar (the parallel variable must be of the current shape). In such cases, the scalar value is first promoted to a parallel value of the shape of the parallel operand, and this parallel value is used in the operation.

C* also supports type conversions. Both promotions and type conversions may be performed m the same instruction. Consider Code Segment 3, below.

```
1           char c;
2           employee_id = c;
       Code Segment 3
```

Recall from Example 3 that employee_id was declared as a parallel variable having a shape employees and a type double. In code segment 3, c is declared as a scalar variable having a type character. Therefore, the assignment statement in line 2 of Code Segment 3 causes c to be promoted to a parallel variable having a shape employees and a type double. In other words, the assignment statement in line 2 of Code Segment 3 causes two operations to be performed. Specifically, a promotion of a scalar variable to a parallel variable is performed. Also, a type conversion from an original base type (that is, character) to a final base type (that is, double) is performed.

3. Overview of the C* Compiler

The general operation of the C* compiler is similar to the operation of conventional compilers. Such operation of conventional compilers are well known and are described in many publically available documents, such as *Compilers, Principles, Techniques, and Tools* by Aho, Sethi, and Ullman (Addison-Wesley Publishing Company, Reading Mass., 1988), which is herein incorporated by reference in its entirety.

As noted above, however, the C* source code 308 may include instructions involving parallel variables. The compilation of such parallel instructions are not well known. In compiling the C* source code 308, the C* compiler 154 replaces these parallel instructions with calls to functions in the Paris library 162.

Figure 3A:
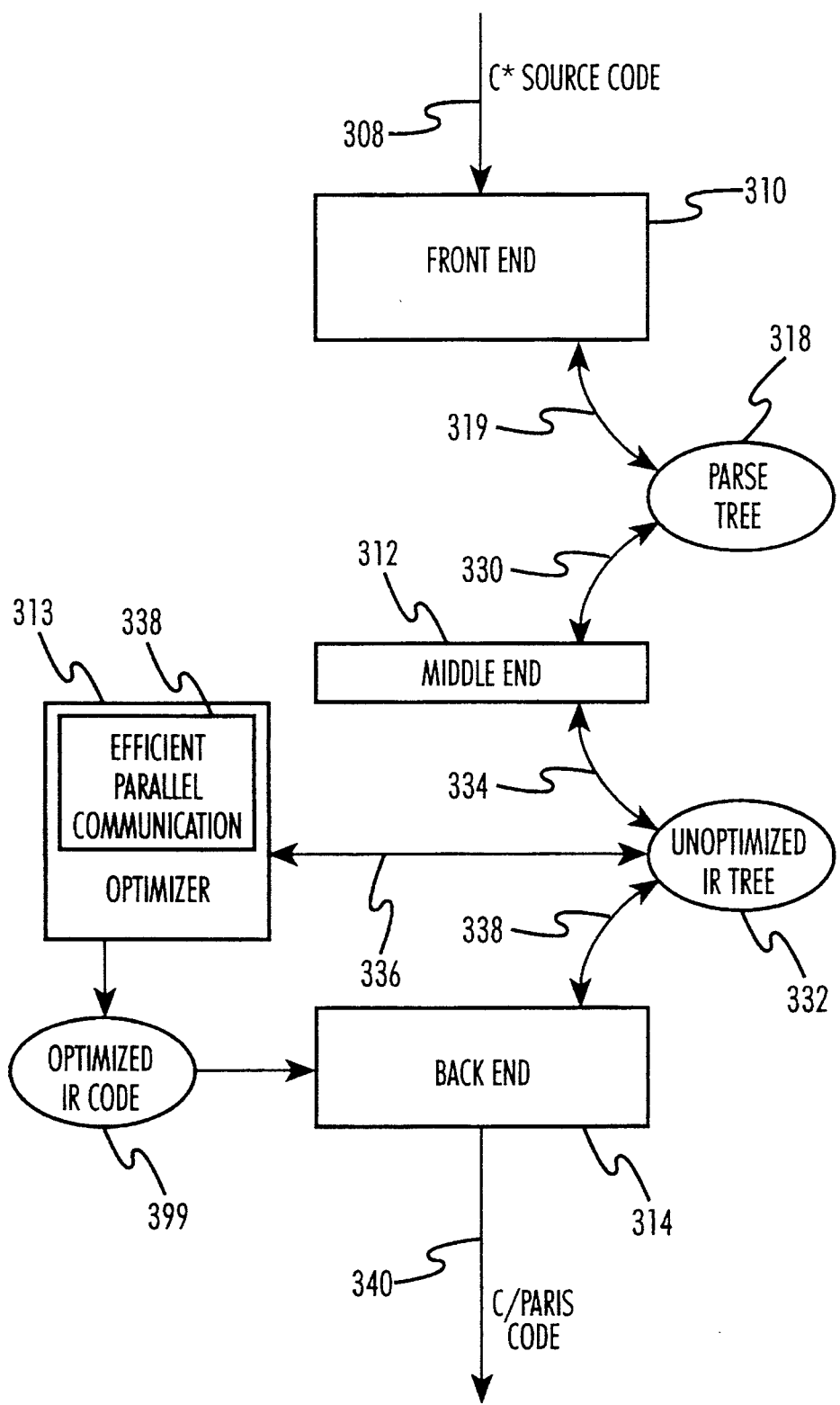
FIG. 3A is a high level block diagram of the structure of a C* compiler of the present invention.
Figure 3B:
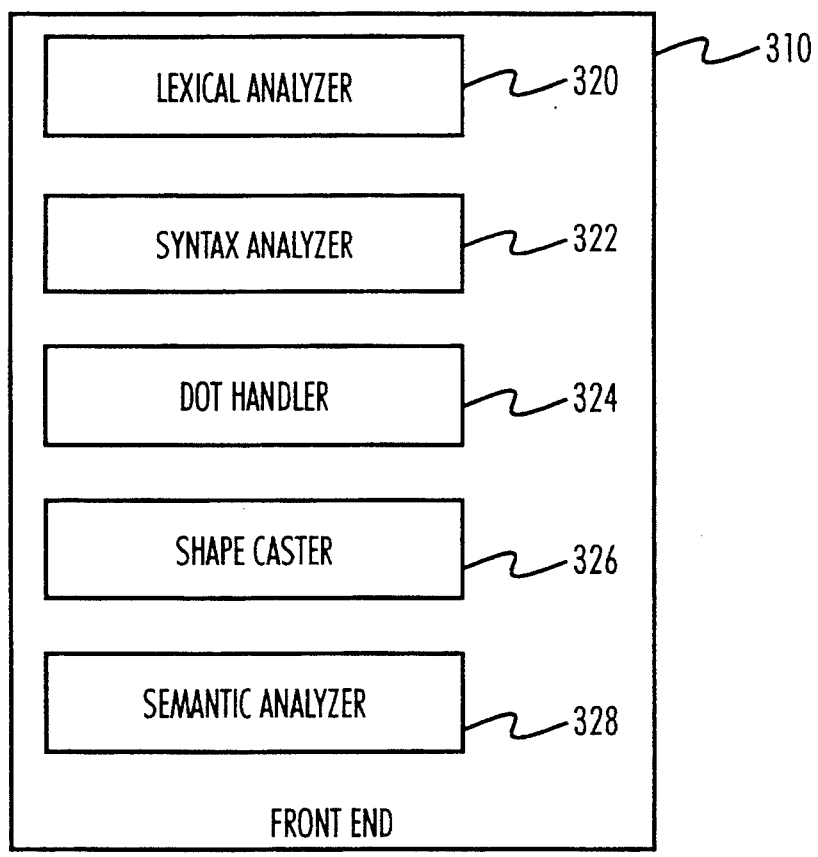
FIG. 3B illustrates the structure of a front end of the C* compiler.

FIG. 3A is a high level block diagram of the structure of the C* compiler 154 of the present invention. As FIG. 3A shows, the C* compiler 154 is comprised of a front end 310, a middle end 314, an optimizer 313, and a back end 314. FIG. 3B illustrates the structure of the front end 310. The front end 310 includes a lexical analyzer 320, a syntax analyzer 322, a dot handler 324, a type caster 326 and a semantic analyzer 328.

Figure 4:
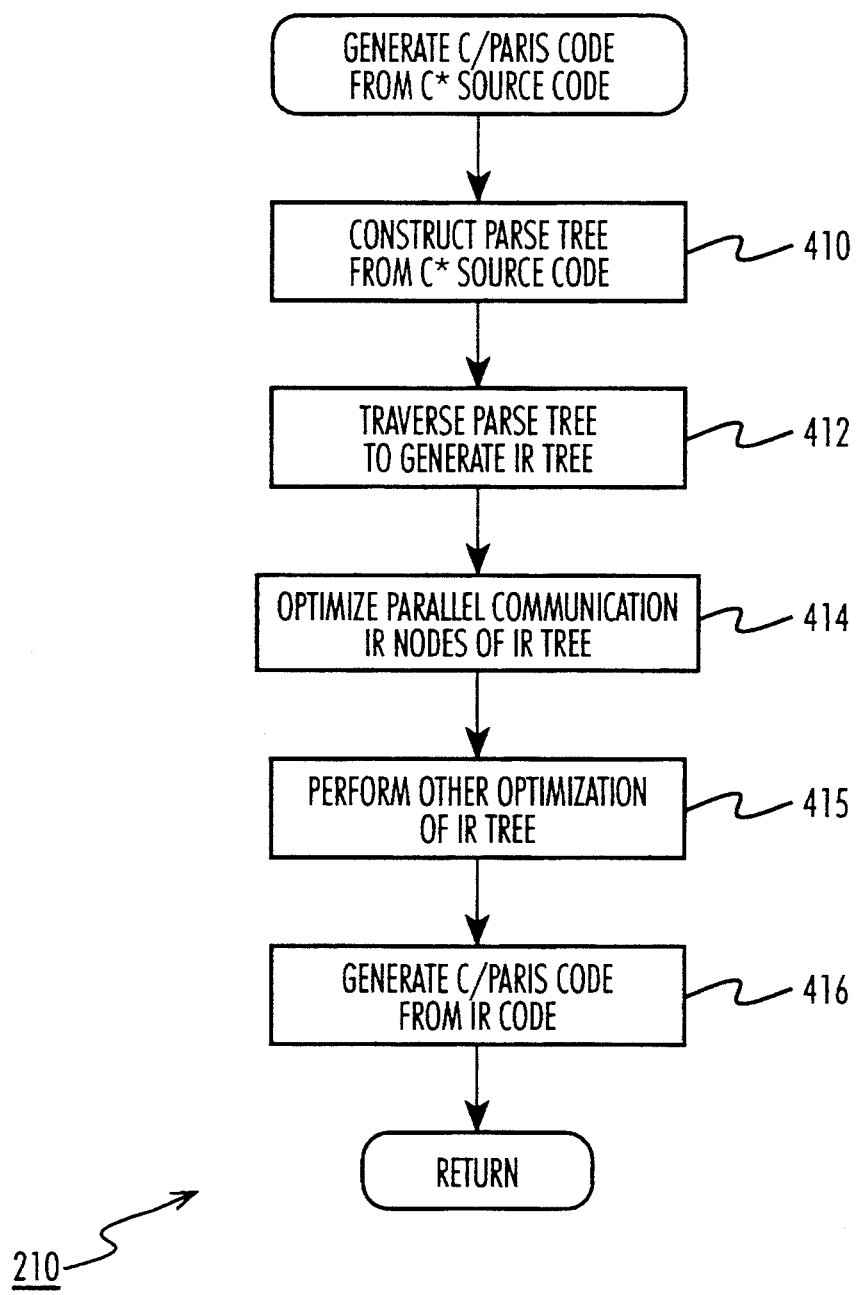
FIG. 4 is a flow chart which illustrates the interaction between modules of FIG. 3A.

FIG. 4 is a flow chart which illustrates the interaction between the modules of FIG. 3A. The flow chart of FIG. 4 also illustrates the detailed method of the step 210 of FIG. 2 of generating C source code from C* source code.

In a step 410, the front end 310 receives C* source code 308 and constructs a parse tree 318. Parse tree construction is carried out by the lexical analyzer 320, syntax analyzer 322, dot handler 324, type caster 326 and semantic analyzer 328.

In a step 412, the middle end 312 receives the parse tree 318 and generates an intermediate representation (IR) code 332. The IR code 332 is also called the IR tree 332. The IR code 332 contains calls to functions in the Paris library 1962. Note that the IR code 332 generated by the middle end 312 is unoptimized.

In a step 414, the IR code optimizer 313 optimizes the unoptimized IR code 332 received from the middle end 312 to produce optimized IR code 399. One aspect of the optimization is carried out by an efficient parallel communication module 338 of the optimizer 313. Specifically, the efficient grid communication module 338 replaces IR nodes which specify general parallel communication with IR nodes which specify grid communication where doing so is possible and would result in a more efficient communication. The structure and operation of the efficient grid communication module 338 is described in a pending patent application entitled "A Compiler For Parallel Communication Instructions" (Attorney Docket No. 1366.0020000), which was cited above.

In a step 415, the optimizer 313 performs other optimization. Some types of optimization require the performance of live variable analysis. Such live variable analysis is discussed below.

The back end 314 receives either the unoptimized IR code 332 (from the middle end 312) or the optimized IR code 399 (from the optimizer 313). In a step 416, the back end 318 generates C source code. As noted above, the C source code contains calls to functions in the Paris library 162. Thus, the C source code is also called C/Paris source code.

4. Incremental Live Variable Analysis

This invention makes two improvements to conventional methods for conducting live variable analysis. First, the present invention is adapted for use with data parallel languages. This is discussed in more detail in Section 4.1.

Secondly, the present invention is computationally efficient at compile time. Additionally, the present invention is incremental in nature. This latter point is important when the optimizer of the present invention wishes to modify the code that has just been analyzed. Modification may invalidate the results of live variable analysis, requiring it to be performed again. The incremental method of the present invention guarantees that live variable analysis may be recomputed with minimal effort after changes are made to the code, whereas standard methods will take just as long to recompute live variable information as they did to initially compute this information. The incremental method may be applied to non-parallel computer languages as well as to data parallel languages. This second feature of the present invention is discussed further in Section 4.2.

4.1. A Live Variable Analysis Approach For Data Parallel Languages

This section generally describes the operation of the optimizer 313 with regard to performing live variable analysis for data parallel languages.

The failure of standard methods for live variable analysis when applied to a data parallel language can be attributed to the use of contextualization in such languages. Contextualization is described above.

Code Segment 4 shows the interaction between contextualization and live variable analysis. The line numbers serve as reference markers only and are not part of the C* program contained in Code Segment 4. This is true throughout this patent document.

```
1       void f(int:current y, int:current z, int n)
2       {
3         int:current x;
4
5         printf("%d",n);
6         x = y;
7         where(z > 10)
8           x = 10;
9         g(x,n);
10      }
Code Segment 4
```

Conventional live variable analysis ignores context and determines that the assignment to x at line 8 kills the assignment to x at line 6, because the value of x is not used in the intervening lines. Therefore, line 6 would be removed by the optimizer. This result is incorrect because the context is changed by the where statement at line 7. Thus, a smaller set of processors are being assigned to at line 8 than at line 6, and x only gets a new value in those processors. For all processors in which z≦10, x retains its previous value; namely, the value assigned at line 6. The flaw in standard live variable analysis is the assumption that a definition of a variable (i.e., an assignment) completely changes its value.

According to the present invention, the optimizer 313 assumes that a definition of a parallel variable is also a reference to the variable, specifically, a reference to values which were set in processors that are not selected by the current context. This is called Rule 1 for reference purposes.

Simply adding Rule 1 has one unfortunate side effect, which is that live variable ranges get extended backwards from the point at which a variable is first defined to the start of the subroutine containing this point. This overly long live range is a straightforward consequence of Rule 1, because a definition is also a reference. This consequence can itself be corrected by adding an additional analysis phase, which computes a simplified form of reaching definitions. Reaching definition analysis is generally described in *Compilers, Principles, Techniques, and Tools* by Aho et al., which was cited above.

According to the present invention, the compiler 313 performs reaching definition analysis by computing, for each line of a program and for each variable, whether any definition of the variable reaches that line. Given reaching definition ranges, the overly long live variable ranges may be shortened by intersecting them with the reaching definition ranges. This yields the desired result. For reference purposes, the operation of the compiler 313 with regard to reaching definition analysis is called Rule 2.

An exception is made to Rule 1 in the case that the parallel variable is defined by an instruction which ignores the current context and defines the variable in all processors. Such instructions are referred to as always instructions. In this case, the normal rule that a definition completely changes its value holds true. Always instructions are generated in the scope of a C* everywhere statement, and also to store results in compiler-generated parallel temporary, variables. The operation of the optimizer 313 with regard to optimizing always instructions is described in U.S. patent application Ser. No. 07/788,004, filed Nov. 5, 1991, by Frankel et al., entitled "System and Method For Parallel Variable Optimization", which was cited above.

4.2. An Efficient Live Variable Analysis Approach

This section generally describes the operation of the optimizer 313 with regard to efficiently performing incremental live variable analysis.

As noted above, conventional methods for live variable analysis are computationally expensive. To understand this, it is first necessary to define the units of program structure upon which such analysis operates.

A C* program is composed of a number of subroutines. Live variable analysis can be performed on each subroutine independently. It shall be assumed in the remainder of this presentation that one subroutine is being dealt with.

A subroutine may be broken down in basic blocks. A basic block is a sequence of IR instructions which must be performed one after the other; i.e., there can be no jumps into the middle of the block nor can there be any jumps out of the middle of the block. A basic block X is called the child of basic block Y if the flow of control can pass from Y to X. Likewise, Y is referred to as the parent of X. A basic block can have multiple children and multiple parents. In the compiler 154 of the present invention, forward and backward links are created between parent and child blocks for convenient access.

An IR instruction, or node, is the smallest unit of computer code that the optimizer 313 deals with. Each IR node computes a result from several variables and stores the result into its destination variable. The storage into the destination variable is said to define it in the same sense that the words define and definition are used in Section 4.1.

A conventional approach to live variable analysis is an iterative technique in which the set of live variables entering and leaving each basic block is computed. These are called the live-in and live-out sets, respectively. At each iteration, live-in and live-out for a block are recomputed based on the definitions and references of variables within each block and the live-in sets of the block's children. Thus, results gradually propagate from descendants to ancestors, and for this reason the blocks are visited from last to first for greatest efficiency. After many passes through all the blocks, the live-in and live-out sets converge on a solution. Once they converge, the conventional approach is complete.

The conventional approach can be inefficient because set operations are performed for every block in every iterative pass. The size of these sets is determined by the number of variables in the subroutine, which can be quite large when including compiler-generated temporaries. Thus, set operations are expensive, and avoiding them in some basic blocks offers a speedup over the standard approach.

The optimizer 313 of the present invention avoids extra set operations by associating a changed flag with every basic block. Blocks with a changed flag equal to false are skipped in each iteration. If the live-in set for a block changes in one iteration, then the changed flag is set to true for the parents of the block. This is because information flows from child to parent; thus a change in the child implies a subsequent change in the parent. The changed flag for the block itself is cleared, and no further set operations will be performed on the block until one of its children sets the block's changed flag.

The changed flag also facilitates incremental live variable analysis. If any IR instructions within a basic block are modified, added to, or deleted, then the changed flag is set for that block. Live variable analysis can then be rerun, and only those blocks that have their changed flag set are processed. Typically, very few blocks need to have their sets recomputed, and the analysis proceeds quickly.

The applicability of the changed flag is not limited to live variable analysis. Rather, it is of more general utility to many forms of analysis that are computed using iterative data flow techniques. For example, the reaching definition analysis performed by the optimizer 313 also uses a changed flag to speed its computation.

4.3. System and Method of tile Present Invention

This section fully describes a preferred embodiment of the optimizer 313 with regard to efficiently performing incremental live variable analysis for data parallel languages.

Figure 5A:
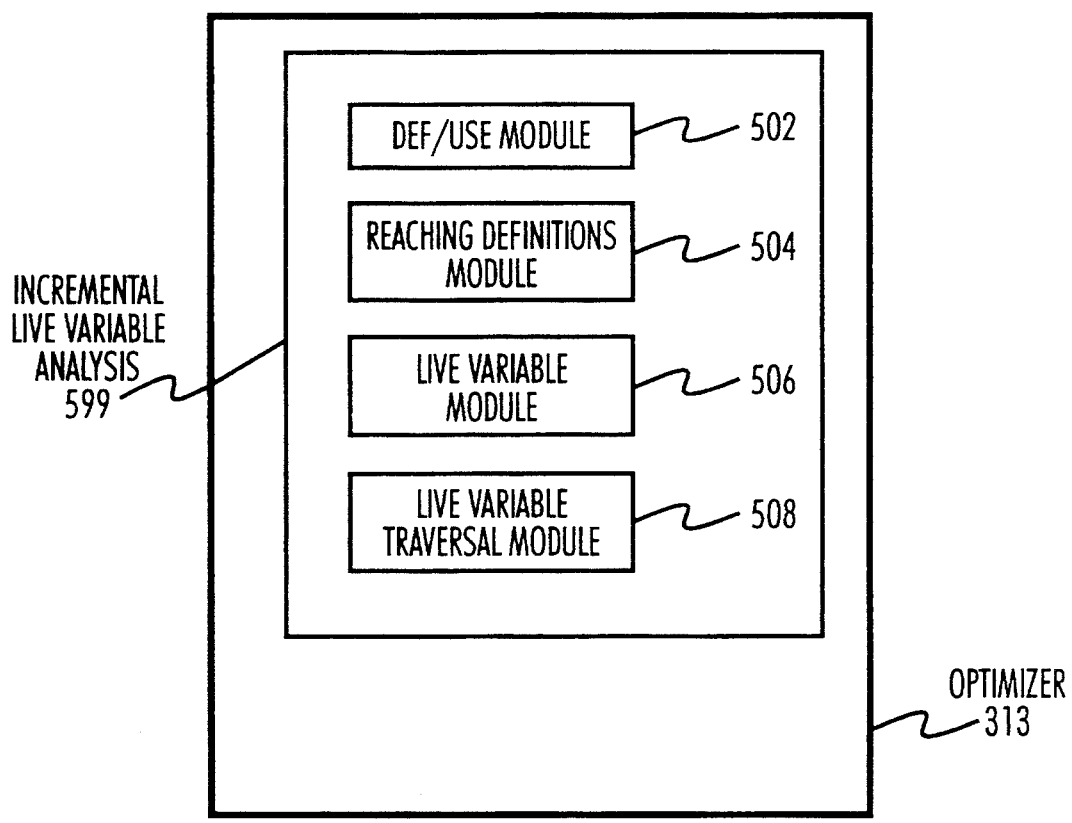
FIG. 5A illustrates a block diagram of an optimizer of the present invention.

FIG. 5A illustrates a block diagram of the optimizer 313. The optimizer 313 includes all incremental live variable analysis component 599. The incremental live variable analysis component 599 performs the incremental live variable analysis which was generally described in the sections above.

The incremental live variable analysis component 599 includes a definition/use module 502, a reaching definitions module 504, a live variable module 506, and a live variable traversal module 508.

Figure 5B:
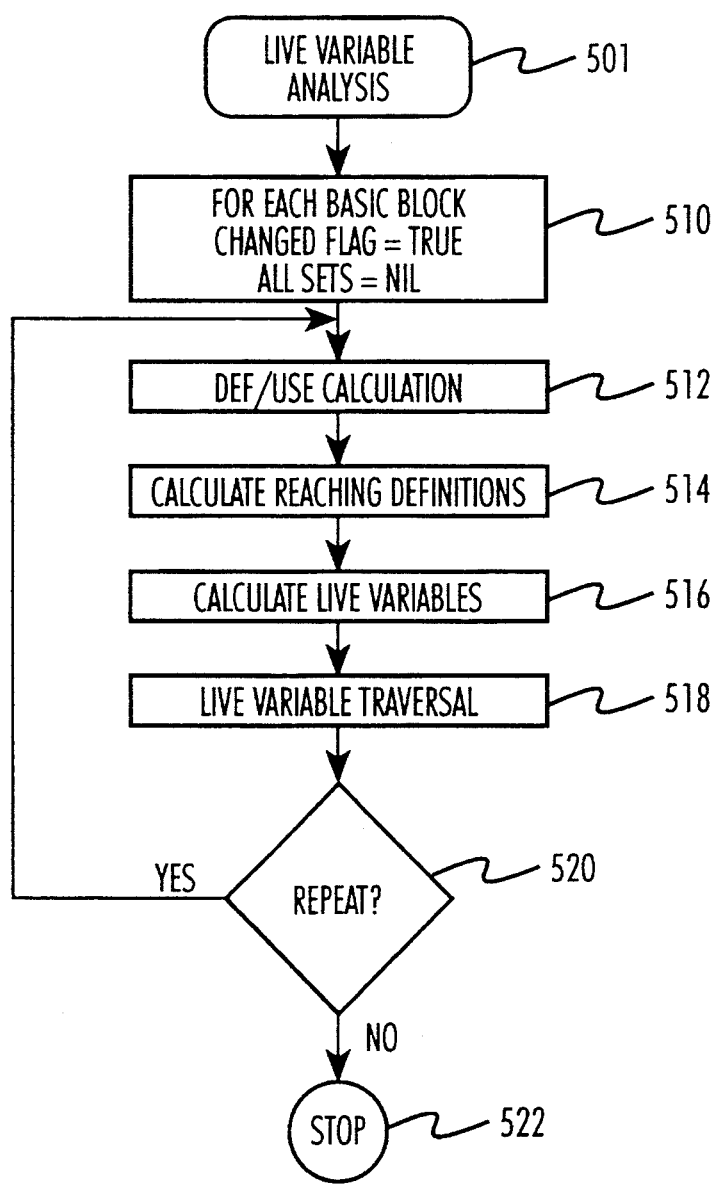
FIG. 5B illustrates a live variable analysis method of the present invention.

FIG. 5B illustrates a live variable analysis method 501 of the present invention. The incremental live variable analysis component 599 operates according to the live variable analysis method 501.

According to the present invention, each of the basic blocks of the unoptimized IR tree 332 includes a changed flag. The changed flag, which was generally described above, will be more fully described in the following paragraphs.

In step 510, the incremental live variable analysis component 599 sets the changed flags for all the basic blocks to true and all the sets (that is, defsets, usesets, reach in sets, reach out sets, live in sets and live out sets—these are described below) to nil. Step 510 represents an initialization step for the live variable analysis method 501.

In step 512, the def/use module 502 performs a def/use calculation 512. That is, the definition/use module 502 receives the unoptimized IR code 332 and generates a definition set (referred to as defset) and a usages set (referred to as useset) for each basic block contained in the unoptimized IR code 332. The defset contains a list of variables which, with regard to linear ordering, are defined in a block before they are used in the block. The useset includes a list of variables which, with regard to linear ordering, are used in a block before they are defined in the block. Defsets and usesets are generally described in *Compilers, Principles, Techniques, and Tools*, by Aho et al., which was cited above.

In step 514, the reaching definitions module 504 calculates reaching definitions 510. That is, the reaching definitions module 504 receives the unoptimized IR code 332 and the defsets and usesets and generates, for each basic block, a reach in set and a reach out set. A reach in set contains, for a given basic block, a list of variables whose definitions reach the beginning of the block. A reach out set contains, for a given basic block, a list of variables whose definitions reach the end of the block. Reach in sets and reach out sets are generally described in *Compilers, Principles, Techniques, and Tools*, by Aho et al., which was cited above.

In step 516, the live variable module 506 calculates live variables. That is, the live variable module 506 receives the defsets, usesets, reach in sets, and reach out sets and generates, for each basic block, a live in set and a live out set. A live in set, for a given basic block, includes a set of variables which are live upon entering the block. A live out set, for a given basic block, includes a set of variables which are live upon exiting the block. Live in sets and live out sets are generally described in *Compilers, Principles, Techniques, and Tools*, by Aho et al., which was cited above.

In step 518, the live variable traversal module performs live variable traversal. That is, the live variable traversal module 508 receives the unoptimized IR code 332 and the live out sets and determines which variables are live at each node of each basic block.

Following the completion of step 518, one pass of the live variable analysis method 501 is complete. In other words, the unoptimized IR tree 332 has been partially optimized. As indicated by step 520, steps 512, 514, 516, and 518 may be performed again to further optimize the unoptimized IR tree 332. The extent to which the unoptimized IR code 332 is optimized by the live variable analysis method 501 is application and user dependent. According to the preferred embodiment, steps 512, 514, 516, and 518 are performed three times (that is, three iterations of the live variable analysis method 501 are performed). Note, however, the initialization step of 510 is performed only once.

Steps 512, 514, 516, and 518 are described in greater detail below with reference to FIGS. 6, 7, 8 and 9, respectively.

Figure 6:
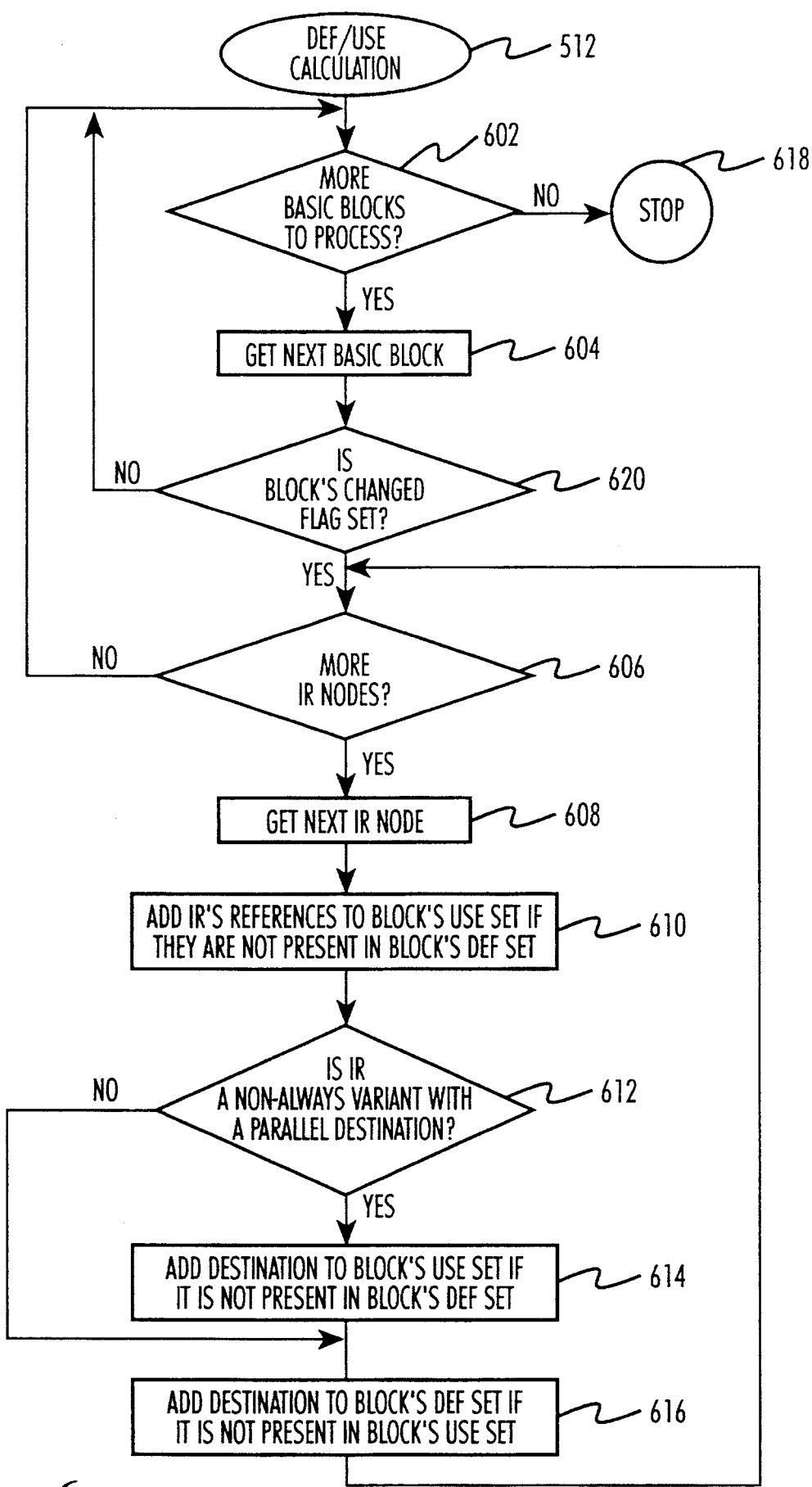
FIG. 6 illustrates a def/use calculation step 512.

FIG. 6 illustrates the def/use calculation step 512 in greater detail. As noted above, the def/use calculation method 512 is performed by the def/use module 502.

In step 602, the def/use module 502 determines whether further basic blocks remain in the unoptimized IR tree 332 to process. If there are no additional basic blocks to process, the def/use calculation method 512 is complete. If there are further basic blocks to process, the def/use module 502 performs step 604.

In step 604, the def/use module 502 selects the next basic block to process. Basic blocks may be visited in any order in this module.

In step 620, the def/use module 502 checks the changed flag of the selected basic block. According to the present invention, the incremental live variable analysis component 599 performs live variable analysis on only those basic blocks having changed flags indicating true (the manner in which the change flags are set to true is described below). Therefore, according to the present invention, set operations are not performed for every basic block in every iterative pass. Instead, set operations are performed on only those basic blocks having change flags equalling true. By avoiding set operations in some basic blocks, the incremental live variable analysis method 501 of the present invention is more efficient than conventional live variable analysis methods.

As illustrated in FIG. 6, if in step 620 the def/use module 502 determines that the block's change flag was set to false, then the def/use module 502 returns to step 602 and step 604 to select a next basic block to process. If in step 620 the def/use module 502 determines that the selected block's change flag is set to true, then the def/use module 502 processes step 606.

In step 606, the def/use module 502 determines whether there are any more intermediate representation (IR) nodes in the selected basic block to process. If no further IR nodes exist to process, then the def/use module 502 returns to step 602 and step 604 to select the next basic block to process. If further IR nodes exist to process, the def/use module 502 moves to step 608.

In step 608, the def/use module 502 selects the next IR node in the selected basic block to process.

In step 610, the def/use module 502 identifies all variable references in the selected IR node. The variable references are those which exist on the right-hand side of the equal sign. For example, suppose that the selected IR node represented the following instruction.

$$a = b + c \qquad \text{(Example 4)}$$

The instruction of Example 4 contains references to variables b and c (note that variables b and c exist on the right-hand side of the equal sign). Therefore, if the def/use module 502 was performing step 610 on a node having the instruction of Example 4, the def/use module 502 would identify that the node had references to variables b and c.

In step 610, after identifying the references in the selected IR node, the def/use module 502 determines whether the references are present in the block's defset. If the references are not in the block's defset, then the references are being used in the selected basic block before they are being defined in the selected basic block. Therefore, in step 610, the def/use module 502 adds those references which are not in the block's defset to the block's useset.

In step 612, the def/use module 502 determines whether the selected IR node contains a non-always instruction having a parallel destination.

If the selected IR node does not contain a non-always instruction with a parallel destination, then the def/use module 502 performs step 616. In other words, if the selected IR node is a serial instruction, or is an always variant of a parallel instruction, then the def/use module 502 performs step 616.

In step 616, the def/use module 502 adds the destination of the instruction in the selected IR node to the block's defset if the destination is not already in the block's useset. For example, if the selected IR node contained the instruction shown in Example 4, the def/use module 502 would add the variable a to the selected basic block's defset if the variable a was not already in the selected block's use set.

If, in step 612, the def/use module 502 determined that the instruction in the selected IR node contained a non-always instruction with a parallel destination, then the def/use module 502 performs step 614. In step 614, the def/use module 502 adds the destination to the selected basic block's use set if the destination is not already present in the selected basic block's defset. In other words, the def/use module 502 is assuming that the definition of the parallel destination is also a reference to the parallel destination. Thus, step 614 implements Rule 1 of the present invention (described above).

The def/use module 502 then performs step 616 as described above. After performing step 616, the def/use module 502 returns to step 606 to process the next IR node in the selected basic block.

Figure 7:
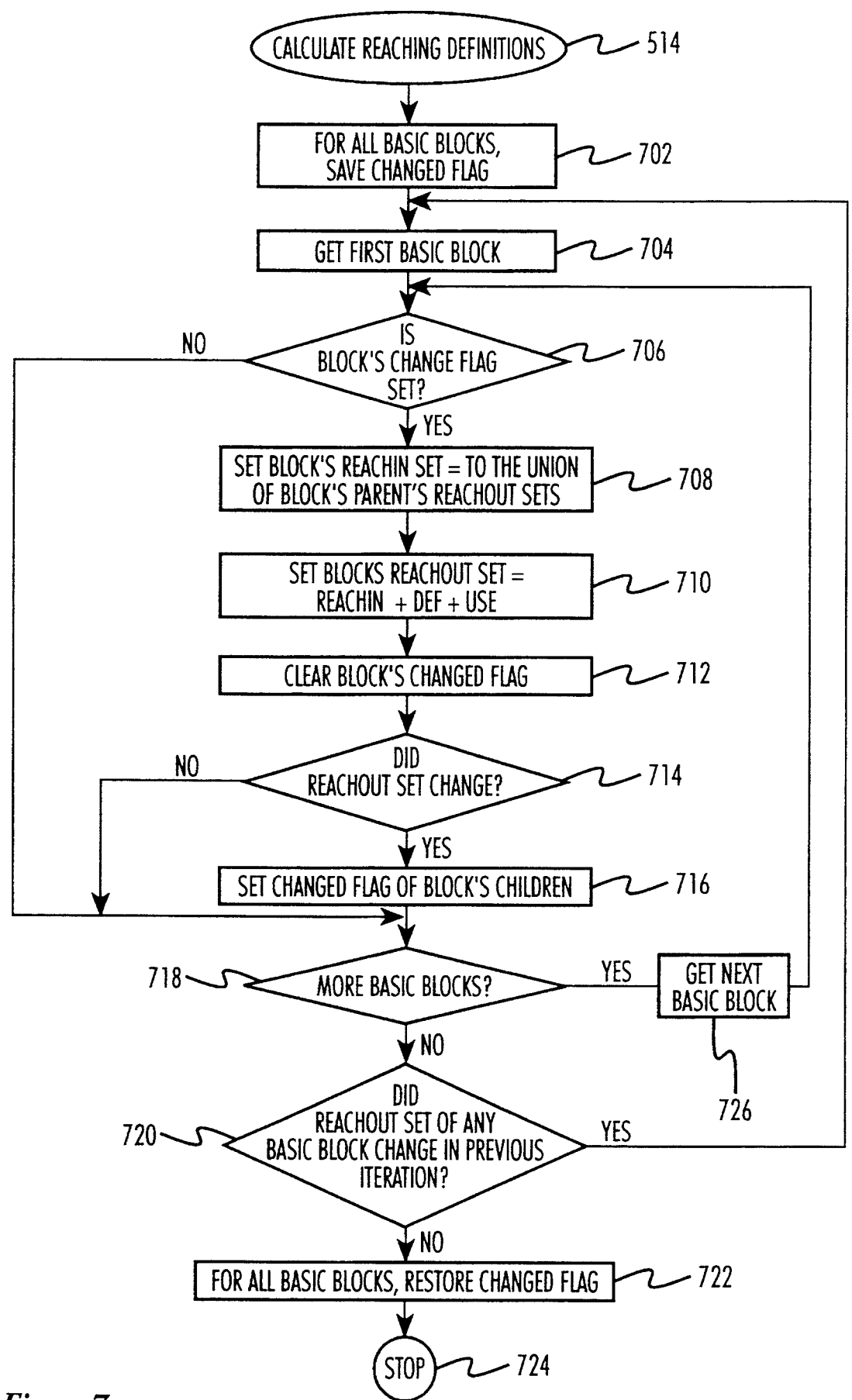
FIG. 7 illustrates a flow chart of a calculate reaching definitions step.

FIG. 7 illustrates a flow chart of the calculate reaching definitions step 514. As noted above, the calculate reaching definitions step 514 is performed by the reaching definitions module 504.

According to the present invention, both the calculate reaching definitions step 514 and the calculate live variables step 516 operate according to and change the values of the change flags as received from the def/use module 502. Thus, so that it does not interfere with the operation of the calculate live variables step 516, the reaching definitions module 504 does not permanently alter the values of the change flags.

Therefore, in step 702, the reaching definitions module 504 saves the values of the change flags for all the basic blocks. Also, in step 722, the reaching definitions module 504 restores the values for the change flags. In this manner, the reaching definitions module 504 does not permanently alter the values of the change flags.

In step 704, the reaching definitions module 504 selects the first basic block of the unoptimized IR code 332 to process. In this module, basic blocks are processed in depth-first traversal order starting with the first block of the procedure.

In step 706, the reaching definitions module 504 determines whether the selected basic block's change flag is set to true. If the change flag is not set to true, the reaching definitions module 504 jumps to step 718. As this operation illustrates again, the incremental live variable analysis component 599 of the present invention performs set operations on only a limited number of the basic blocks. In this manner, the incremental live variable analysis component 599 is more efficient than conventional methods for performing live variable analysis.

If, in step 706, the reaching definitions module 504 determines that the selected basic block's change flag is set to true, then the reaching definitions module 504 performs step 708.

In step 708, the reaching definitions module 504 sets the selected block's reach in set equal to tile union of the selected block's parents' reach out sets. In other words, tile reaching definitions module 504 assumes that the variables whose definitions reach the end of the selected block's parents are equal to tile variables whose definitions reach the beginning of the selected block.

In step 710, the reaching definitions module 504 sets the selected basic block's reach out set equal to the set union of the basic block's reach in set, defset and useset.

In step 712, the reaching definitions module 504 clears the selected basic block's change flag (that is, the reaching definitions module 504 sets the selected basic block's change flag to false).

In step 714, the reaching definitions module 504 determines whether the reach out set of the selected basic block changed. Note that the reach out set will change only if the reach in set changes, and the reach in set changes only if the selected basic block's parents' reach out sets change.

If the selected basic block's reach out set did not change, then the reaching definitions module 504 goes to step 718. If the selected basic block's reach out set changed, however, the reaching definitions module 504 performs step 716.

In step 716, the reaching definitions module 504 sets the change flags of the selected basic block's children. By setting the change flags, the reaching definitions module 504 ensures that steps 708, 710, and 712 will be performed for the selected basic block's children. Such performance is necessary for the selected basic block's children because the reach in sets associated with these children will change due to the change in the selected basic block's reach out set.

In step 718, the reaching definitions module 504 determines whether there are more basic blocks in the unoptimized IR code 332 to process. If there are more basic blocks to process, the reaching definitions module 504 performs step 726. Otherwise, the reaching definitions module 504 performs step 720.

In step 726, the reaching definitions module 504 selects the next basic block to process. Then, the reaching definitions module 504 returns to step 706.

In step 720, the reaching definitions module 504 determines whether the reach out set associated with any basic block changed in the previous iteration of steps 704, 706, 708, 710, 712, 714, 716, 718, and 726 over all blocks. If the reach out sets of any of the basic blocks did change, the reaching definitions module 504 returns to step 704 to perform another iteration. Otherwise, the reaching definitions module 504 performs step 722 (as described above).

As step 720 illustrates, the reaching definitions module 504 generates the reach out and reach in sets in an iterative manner. Eventually, the reach in sets and reach out sets stabilize such that no reach out sets change during an entire iteration. When this occurs, the calculate reaching definition step 514 is complete.

Figure 8:
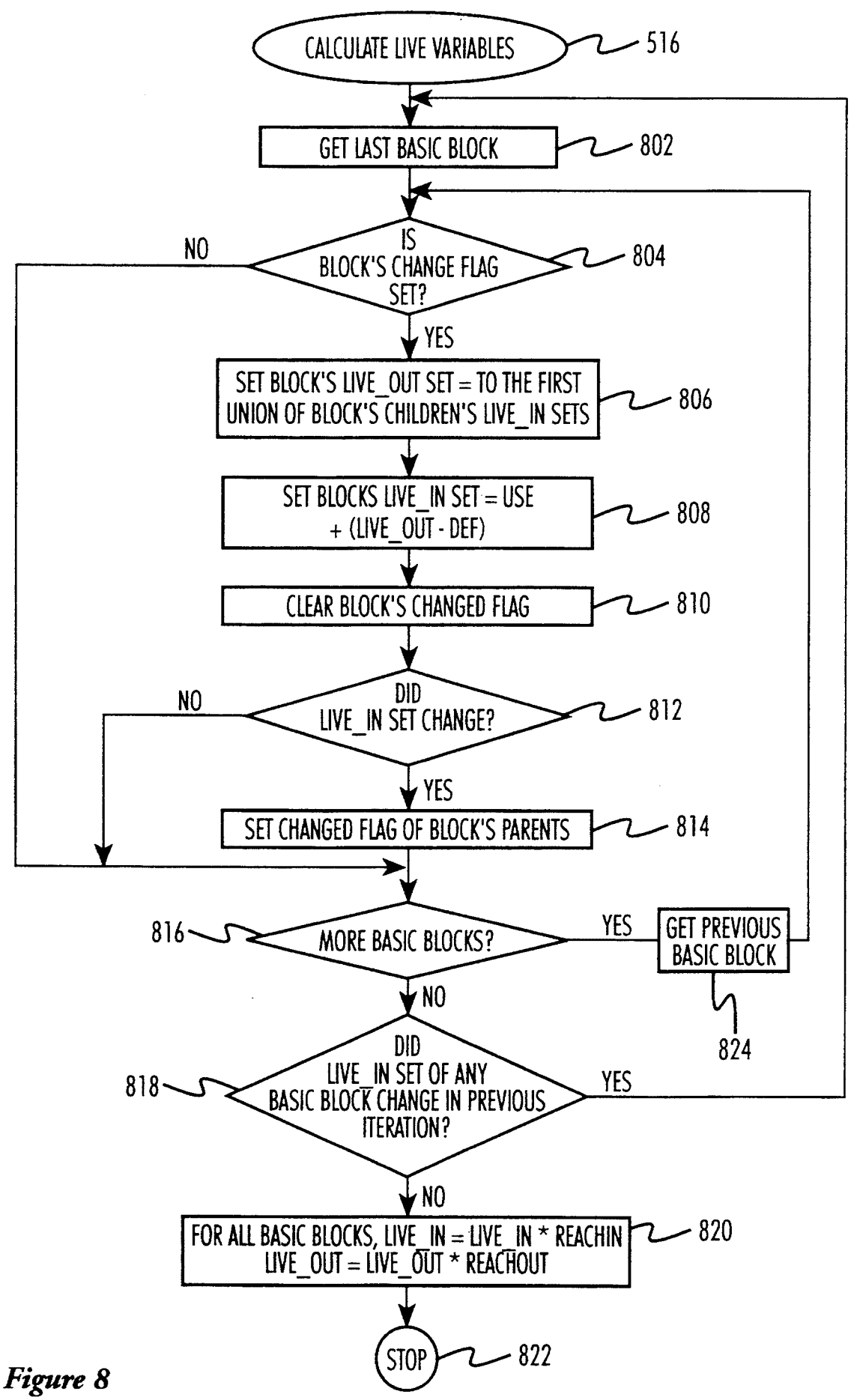
FIG. 8 illustrates a flow chart of a calculate live variable step.

FIG. 8 illustrates a flow chart of the calculate live variable step 516. As noted above, the live variable module 508 performs the calculate live variable step 516.

Module 506 traverses the basic blocks of the unoptimized IR tree 332 in a reversal of depth first traversal order. Therefore, in step 802, the live variable module 506 selects the last basic block in the unoptimized IR tree 332 for processing.

In step 804, the live variable module 506 determines whether the selected basic block's change flag is set to true. If the flag is not set to true, the live variable module 506 jumps to step 816. This operation of the live variable module 506 illustrates again that the incremental live variable analysis component 599 of the present invention performs set operations with regard to live variable analysis on only a portion of the basic blocks in the unoptimized IR tree 332. In this manner, the incremental live variable analysis component 599 is more efficient than conventional methods for performing live variable analysis.

If, in step 804, the live variable module 506 determines that the selected basic block's change flag is set to true, then the live variable module 506 performs stop 806.

In step 806, the live variable module 506 sets the selected basic block's live out set equal to a union of the selected basic block's children's live in sets. In other words, the live variable module 506 assumes that the variables which are live upon exiting the selected basic block are also the variables which are live upon entering the selected basic block's children.

In step 808, the live variable module 506 sets the selected block's live in set equal to the set union of its useset and the set difference of the selected block's live out set and defset.

In step 810, the live variable module 506 clears the selected block's change flag.

In step 812, the live variable module 506 determines whether the selected basic block's live in set changed. If the live in set did not change, then the live variable module 506 skips over step 814 and moves to step 816. Otherwise, the live variable module performs step 814.

In step 814, the live variable module 506 sets the change flags of the block's parents. By setting the change flags, the live variable module 506 ensures that steps 806, 808, and 810 will be performed for the block's parents. Such performance is necessary, since the live out sets associated with these parents will change due to the change in the live in set of the selected basic block.

In step 816, the live variable module 506 determines whether there are additional basic blocks in the unoptimized IR tree 332 to process. If there are additional basic blocks to process, the live variable module 506 performs step 824. Otherwise, the live variable module 506 performs step 818.

In step 824, the live variable module 506 selects the next basic block (moving backwards in the chain of basic blocks) for processing. Then, the live variable module 506 moves to step 804 in order to perform an iteration on the new basic block selected in step 824.

In step 818, the live variable module 506 determines whether any live in set of any basic block changed during the iteration over all blocks in steps 802, 804, 806, 808, 810, 812, 814, 816, and 824. If any live in set did change, the live variable module 506 initiates another iteration by moving to step 802. Otherwise, the live variable module 506 processes step 820.

As indicated by step 818, the live variable module 506 generates the live in sets and live out sets in an iterative manner. Iterations are performed until none of the live in sets change during the previous iteration. Eventually, no live in sets change during an iteration and the calculate live variable step 516 is complete (other than performing step 820).

In step 820, the live variable module 506 adjusts the live in and live out sets in accordance with Rule 2 of the present invention (discussed above). In other words, in step 820 the live variable module 506 decreases the live ranges of the variables in the live in and live out sets. Specifically, the live variable module 506 sets the live in sets equal to the intersection of the live in sets and the reach in sets. Additionally, the live variable module 506 sets the live out sets equal to the intersection of the live out sets and the reach out sets. Step 820 is performed on a per basic block basis.

Step 820 is further illustrated by way of an example with reference to Code Segment 4. Assume that Code Segment 4 contains a block 1 comprising lines 5 and 6. In step 808, the live variable module 506 would determine that the live in set associated with block 1 included variable x. This is true since, according to Rule 1, the definition of variable x is also a reference to variable x so that x would be in block 1's useset (as calculated in the def/use calculation step 512—specifically step 614). However, this is an overly long live range of variable x since variable x is not live upon entering block 1. As noted above, this overly long live range of variable x is a result of the application of Rule 1.

Note that the reach in set associated with block 1 does not contain the variable x since the definition of variable x does not extend to the beginning of block 1. Therefore, the set intersection of the live in set and the reach in set associated with block 1 yields a live in set which does not contain the variable x. Therefore, the operation of step 820, as noted above, implements Rule 2 of the present invention.

Following the performance of step 820, the calculate live variables step 516 is complete.

Figure 9:
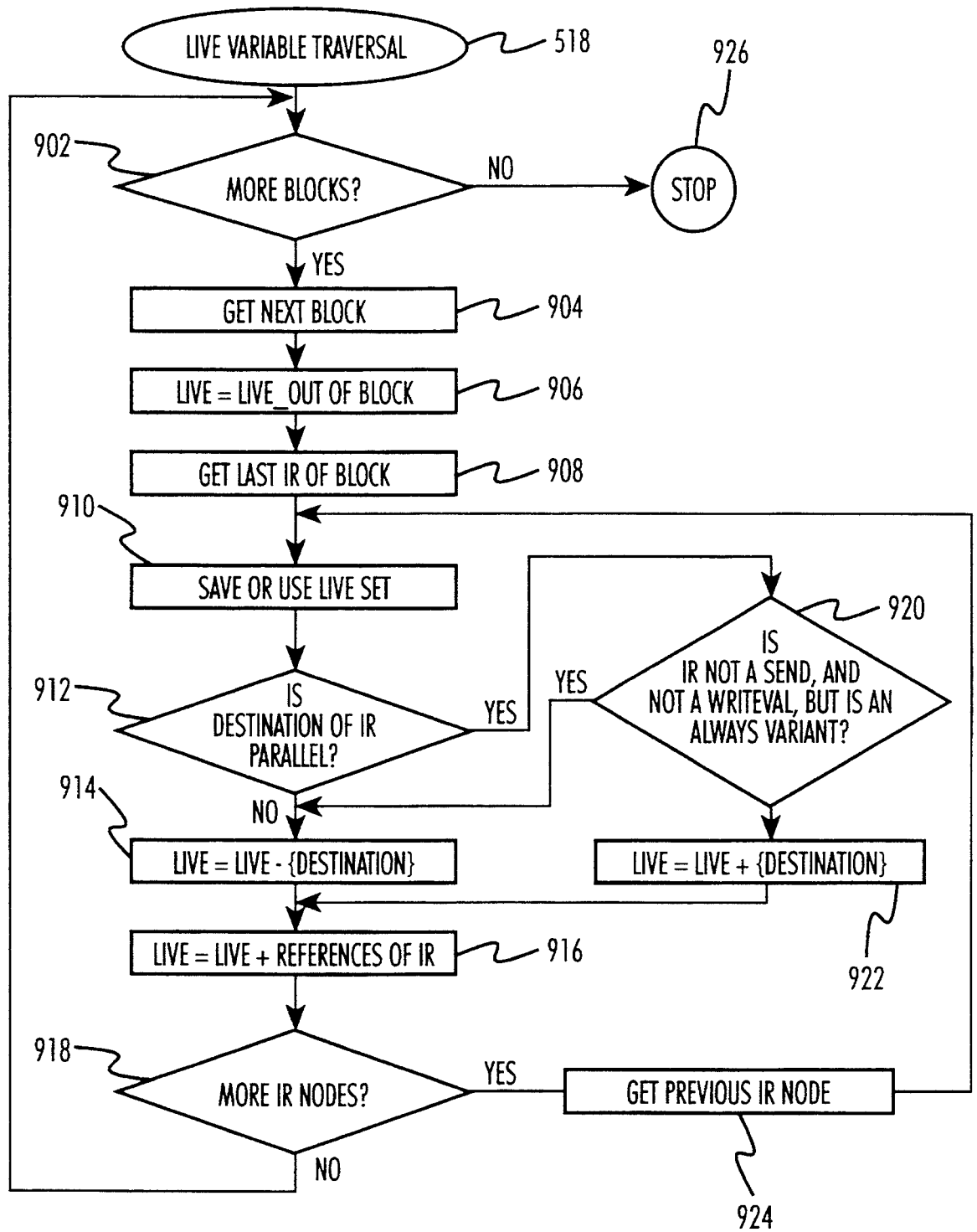
FIG. 9 illustrates a flow chart of a live variable traversal step.

FIG. 9 illustrates a flow chart of the live variable traversal step 518. As noted above, the live variable traversal module 508 performs the live variable traversal step 518. In performing the live variable traversal step 518, the live variable traversal module 508 uses the live out sets in order to interpolate between the live in and live out sets to determine which variables are live at every node in every basic block.

In step 902, the live variable traversal module 508 determines whether any basic blocks remain to process. If no further basic blocks remain to process, the live variable traversal step 518 is complete. If, in step 902, more blocks remain to be processed, then the live variable traversal module 508 processes step 904.

In step 904, the live variable traversal module 508 selects the next basic block to process.

In step 906, the live variable traversal module 508 initializes a live set for the selected basic block equal to the live out set of the selected basic block.

In step 908, the live variable traversal module 508 selects the last IR node of the selected basic block to process. Thus, the live variable traversal module 508 processes the nodes in the selected basic block starting from the bottom.

The live set (as initialized in step 906) includes a list of the variables which are live when the selected IR node is executed. This is true since the live set contains a list of the variables which are live upon exiting the selected basic block, and the selected IR node is the last node of the basic block.

Therefore, prior to executing step 910, the live variable traversal module 508 knows which variables are live at the selected IR node. Therefore, in step 910, the live variable traversal module 508 saves the live set for future processing. The live variable traversal module 508 saves a live set for each node in the selected basic block. These saved live sets contain lists of variables which are live at each of the respective IR nodes in the selected basic block.

Note that tile storage required to save these live sets for each of the IR nodes is substantial. Therefore, according to another embodiment of the present invention, during step 910 the live variable traversal module 508 immediately uses the live set to optimize the unoptimized IR tree 332, instead of saving the live set for deferred use. For example, the live variable traversal module 508 may delete the selected IR node if the destination of the selected IR node is not live. Such operation is conventionally called dead code elimination.

Also, tile live variable traversal module 508 during step 910 may update the conflict set. The conflict set includes lists of variables which are simultaneously live in any of the nodes of the program. The conflict set may be used to perform other optimizations. Such other optimizations may include, for example, parallel variable optimizations. Such parallel variable optimizations are described in a patent application entitled "System and Method for Parallel Variable Optimization," which was cited above.

Also, the live variable traversal module 508 may use the information in the live set for any other conventional use of live information.

Following the performance of step 910, the live variable traversal module 508 operates to update the live set for the next iteration of the live variable traversal step 518.

Therefore, in step 912, the live variable traversal module 508 determines whether the destination of tile selected IR node is a parallel variable. If the destination variable is not a parallel variable, then the definition of tile destination variable is not also a reference to the destination variable. Therefore, in the node which immediately precedes the selected IR node, the destination variable is not live. Consequently, if the live variable traversal module 508 determines in step 912 that the destination of the IR node is not a parallel variable, then the live variable traversal module 508 performs step 914. In step 914, the live variable traversal module 508 deletes tile destination variable from the live set.

Alternatively, if the destination variable in the selected IR node is a parallel variable, then the definition of the destination variable also represents a reference to the destination variable (this is a result of Rule 1, described above). Consequently, in the node which immediately precedes the selected IR node, the destination variable is live. Therefore, if the live variable traversal module 508 determines in step 912 that the destination variable of the IR node is a parallel variable, then the live variable traversal module 508 performs step 922 (step 920 is assumed for the moment to equate to "No"). In step 922, the live variable traversal module 508 adds the destination variable to the live set.

Note that, from step 912, the live variable traversal module 508 performs step 920 before performing step 922. In step 920, the live variable traversal module 508 determines whether the IR node is an "always" instruction (but not a send or a writeval instruction). If the selected IR node is not a send and not a writeval, but is an "always" instruction, then the destination variable of the selected IR node behaves as a serial variable. Therefore, the live variable traversal module 508 performs step 914, rather than step 922.

However, if the live variable traversal module 508 determines that the selected IR node is not an "always" instruction, or if it is an "always" instruction it is either a send or a writeval instruction, then the destination variable in the selected IR node performs as a parallel variable. In such a case, the live variable traversal module 508 performs step 922, rather than step 914.

After performing either step 914 or step 922, the live variable traversal module 508 performs step 916. Note that in order for the selected IR node to operate properly, the references in the selected IR node must be live prior to the execution of the selected IR node. Consequently, the references in the selected IR node must be live in the node which immediately precedes the selected IR node. In step 916, therefore, the live variable traversal module 508 adds the references of the selected IR node to the live set.

In step 918, the live variable traversal module 508 determines whether there are additional IR nodes in the selected basic block to process. If there are additional IR nodes to process, then the live variable traversal module 508 performs step 924. In step 924, the live variable traversal module 508 selects tile previous IR node to process (that is, the live variable traversal module 508 moves up in the IR tree). Then, the live variable traversal module 508 returns to step 910 in order to process the newly selected IR node. Note that tile live set, as modified in steps 914, 922, and 916, includes a list of tile variables that are live during the execution of tile newly selected node (which was selected in step 924).

If, in step 918, tile live variable traversal module 508 determined that there were no other IR nodes to process in the selected basic block, then the live variable traversal module 508 jumps back to step 902 in order to process the next basic block in the unoptimized IR tree 332.

In the foregoing, note that the use of the term "unoptimized IR tree 332" was primarily for reference purposes. In fact, throughout the performance of the above-described steps, the unoptimized IR tree 332 is gradually being optimized by the optimizer 313. Also, the unoptimized IR tree 332 is being optimized by other functions of tile optimizer 313. Therefore, the unoptimized IR tree 332 could also have been called the partially optimized IR tree 332.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for generating an object code program to be executed by a target computer comprising a processor array comprising a plurality of processing nodes for processing data in parallel, in response to a source code program written in a high-level language, the high-level language including a plurality of instructions, at least some of the instructions including an always variant to be executed by all of the processing nodes regardless of a context condition and a non-always variant to be executed on ones of the processing nodes having a selected context condition, said system including:

(a) intermediate representation generating means for generating an intermediate representation in response to the source code program, the intermediate representation having a series of intermediate representation nodes representative of source code instructions, at least some intermediate representation nodes each including at least one variable used as a referenced variable and at least some intermediate representation nodes each including at least one variable used as a destination variable;

(b) a definition/use set generating means for generating, in response to the intermediate representation, a definition set and a use set, the use set identifying those variables which are first used in the intermediate representation node series as (i) referenced variables in any intermediate representation nodes or (ii) first destination variables in intermediate representation nodes representing non-always instruction variants, and the definition set identifying those variables which are otherwise first used in the intermediate representation node series as destination variables;

(c) optimization means for generating an optimized intermediate representation in response to the intermediate representation generated by the intermediate representation generating means and the definition set and the use set generated by the definition/use set generating means.

2. A system as defined in claim 1 in which the definition/use set generating means comprises:

(A) definition set and use set establishment means for initializing a definition set and a use set for variables in the intermediate representation;

(B) intermediate representation node selection means for selecting an intermediate representation node;

(C) use set reference addition means for determining, for each variable which is a reference variable in the selected intermediate representation node, whether the definition set identifies the variable and if not adding an identification of the variable to the use set;

(D) instruction type determination means for determining whether the instruction represented by the selected intermediate representation node is a non-always variant;

(E) contextual definition set reference addition means for, in response to a positive determination by the instruction type of determination means, determining, for each destination variable identified in the intermediate reference node, whether the definition set identifies the destination variable and if not adding the identification of the destination variable to the use set;

(F) definition set reference addition means for determining, for each destination variable identified in the intermediate reference node, whether the use set identifies the destination variable and if not adding an identification of the destination variable to the definition set; and (G) iteration control means for controlling the intermediate representation node selection means, the use set reference addition means, the instruction type determination means, the contextual definition set reference addition means and the definition set reference addition means through a series of intermediate representation node selection means selecting successive intermediate representation nodes in the series in successive iterations.

3. A system as defined in claim 1 in which the intermediate representation generating means generates the intermediate representation as a series of blocks and establishes for each block a change status flag having a changed condition and an unchanged condition, the intermediate representation generating means initializing each block's status flag to the changed condition, the definition/use set generating means further includes a status flag conditioning means for conditioning the status flag of each block to the unchanged condition after establishing the definition set and the use set for each block.

4. A computer-implemented method of generating an object code program to be executed by a target computer comprising a processor array comprising a plurality of processing nodes for processing data in parallel, in response to a source code program written in a high-level language, the high-level language including a plurality of instructions, at least some of the instructions including an always variant to be executed by all of the processing nodes regardless of a context condition and a non-always variant to be executed on ones of the processing nodes having a selected context condition, said computer-implemented method including the steps of:

(1) generating an intermediate representation in response to the source code program, said intermediate representation having a series of intermediate representation nodes representative of source code instructions, at least some intermediate representation nodes each including at least one variable used as a referenced variable and at least some intermediate representation nodes each including at least one variable used as a destination variable;

(2) generating, in response to said intermediate representation, a definition set and a use set, said use set identifying those variables which are first used in said intermediate representation node series as (i) reference representation nodes or (ii) first destination variables in intermediate representation nodes representing non-always instruction variants, and said definition set identifying those variables which are otherwise first used in said intermediate representation node series as destination variables; and (3) generating an optimal intermediate representation in response to said intermediate representation and said definition set and said use set.

5. A method as defined in claim 4 in which said definition set and use set generating step comprises the steps of iteratively:

(a) selecting an intermediate representation node, during successive iterations successive ones of said intermediate representation nodes in said intermediate representation being selected;

(b) determining, for each variable which is a reference variable in said selected intermediate representation node, whether said definition set identifies said (c) determining whether the instruction represented by said selected intermediate representation node is a non-always variant and in response to a positive determination, determining, for each destination variable identified in said intermediate reference node, whether said definition set identifies said destination variable and if not adding an identification of said destination variable to said use set; and (d) determining, for each destination variable identified in said intermediate reference node, whether said use set identifies said destination variable and if not adding an identification of said destination variable to said definition set.

6. A method as defined in claim 4 in which said intermediate representation is generated as a series of blocks, for each block a change status flag being established initially having a changed condition and an unchanged condition, said status flag of each block being changed to said unchanged condition after establishing said definition set and said use set for each block.

7. The method of claim 4, wherein said intermediate representation is generated as a series of blocks, wherein a status flag associated with each block is initialized to a first value.

8. The method of claim 7, further comprising the step of checking said flag associated with a block to determine whether it is set to said first value, and if so, then, (a) generating said definition set and said use set for said block;

(b) generating from said intermediate representation, said definition set, and said use set a reach-in set and a reach-out set for said block;

(c) generating from said definition set, said use set, said reach-in set, and said reach-out set a live-in set and a live-out set for said block; and (d) determining from said intermediate representation and said live-out set which variables are live at each intermediate representation node in said block.

9. The method of claim 8, wherein step (a) of generating said definition set and said use set comprises the steps of iteratively:

(i) selecting an intermediate representation node, during successive iterations successive ones of said intermediate representation nodes in said intermediate representation being selected;

(ii) determining, for each variable which is a reference variable in said selected intermediate representation node, whether said definition set identifies said variable and if not adding an identification of said variable to said use set;

(iii) determining whether said instruction represented by said selected intermediate representation node is a non-always variant and in response to a positive determination, determining, for each destination variable identified in said intermediate reference node, whether said definition set identifies said destination variable and if not adding an identification of said destination variable to said use set; and (iv) determining, for each destination variable identified in said intermediate reference node, whether said use set identifies said destination variable and if not adding an identification of said destination variable to the definition set.

10. The method of claim 8, further comprising the step of repeating steps (a) through (d) for all blocks in said intermediate representation.

11. The method of claim 8, wherein step (b) comprises the step of:

(i) determining whether said flag associated with said block is set to said first value, and if so, then (A) set said reach-in set associated with said block equal to the union of said blocks parents' reach-out sets, (B) set said reach-out set associated with said block equal to the set union of said reach-in set, said definition set, and said use set associated with said block, and (C) setting said flag associated with said block to a second value; and (ii) determining whether said reach-out set associated with said block changed, and if so, then setting a flag associated with the children of said block to a first value.

12. The method of claim 11, further comprising the step of repeating steps (i) and (ii) for each block in said intermediate representation.

13. The method of claim 11, further comprising the steps of saving the status of said flag for each block before step (i) and restoring said flag for each of said blocks once it is determined that the reach-out set associated with all of said blocks has not changed during the previous iteration.

14. The method of claim 11, wherein blocks are processed in depth-first traversal order.

15. The method of claim 8, wherein step (c) comprises the step of reducing the size of said live-out set associated with one of said blocks by intersecting said live-out set and said reach-out set.

16. The method of claim 8, wherein step (c) comprises the steps of:

(i) determining whether said flag associated with said block is set to said first value, and if not, then stopping;

(ii) setting said live out set associated with said block equal to a union of the live-in sets of the children of said block;

(iii) setting said live-in set associated with said block equal to a set union of said use set of said block and a set difference of said live-out set and said definitions set associated with said block;

(iv) setting said flag associated with said block to a second value; and (v) determining whether said live-in set associated with said block has changed, and if so, then setting said flag associated with the parents of said block to said first value.

17. The method of claim 16, further comprising the steps of determining whether any of said live-in sets associated with any of said blocks has changed, and if so, then traversing in a reversal of depth first traversal order each block in said intermediate representation while performing steps (i) through (v) for each block.

18. The method if claim 17, further comprising the steps of setting for each of said blocks said live-in set equal to the intersection of said live-in sat and said reach-in set, and setting for each of said blocks said live-out set equal to the intersection of said live-out set and said reach-out set.

19. The method of claim 8, wherein step (d) comprises the steps of:

(i) initializing a live set for said block equal to said live-out set of said block;

(ii) determining whether a destination of a selected intermediate representation node in said block is a parallel variable, and if not, then deleting said destination from said live set and advancing to step (v);

(iii) determining whether said selected intermediate representation node is an always instruction, but not a send or a writeval instruction, and if so, then deleting said destination from said live set and advancing to step (v);

(iv) adding said destination to said live set; and (v) adding references in said selected intermediate representation node to said live set.

20. The method of claim 19, further comprising a step of saving said live set prior to performing step (ii).

21. The method of claim 19, further comprising the step of repeating steps (i) through (v) for every node in said block.

22. The method of claim 8, further comprising a step of updating a conflict set, said conflict set includes a list of variables which are simultaneously live in any of the intermediate representation nodes in each of said blocks.

23. A system for generating an object code program to be executed by a target computer comprising a processor array comprising a plurality of processing nodes for processing data in parallel, in response to a source code program written in a high-level language, the high-level language including a plurality of instructions, at least some of the instructions including an always variable to be executed by all of the processing nodes regardless of a context condition and a non-always variant to be executed on ones of the processing nodes having a selected context condition, said system including:

(a) a computer for performing data processing operations; and (b) a control arrangement for controlling data processing operations performed by the computer, the control arrangement comprising:

(i) an intermediate representation generating module for enabling the computer to generate an intermediate representation in response to the source code program, the intermediate representation having a series of intermediate representation nodes representative of source code instructions, at some intermediate representation nodes each including at least one variable used as a referenced variable and at least some intermediate representation nodes each including at least one variable used as a destination variable;

(ii) a definition/use set generating module for enabling the computer to generate, in response to the intermediate representation, a definition set and a use set, the use set identifying those variables which are first used in the intermediate representation node series as (i) referenced variables in any intermediate representation nodes or (ii) destination variables in intermediate representation nodes representing non-always instruction variants, and the definition set identifying those variables which are otherwise first used in the intermediate representation node series as destination variables; and (iii) an optimization module for enabling the computer to generate an optimized intermediate representation in response to the intermediate representation and the definition set and the use set.

24. A system as defined in claim 23 in which the definition/use set generating module comprises:

(A) definition set and use set establishment module for enabling the computer to initialize a definition set and a use set for variables in the intermediate representation;

(B) an intermediate representation node selection module for enabling the computer to select an intermediate representation node;

(C) a use set reference addition module for enabling the computer to determine, for each variable which is a reference variable in the selected intermediate representation node; whether the definition set identifies the variable and if not to enable the computer to add an identification of the variable to the use set;

(D) an instruction type determination module for enabling the computer to determine whether the instruction represented by the selected intermediate representation node is a non-always variant;

(E) a contextual definition set reference addition module for enabling the computer to, in response to a determination that the instruction represented by the selected intermediate representation node is a non-always invariant, whether the definition set identifies the destination variable and if not to enable the computer to add the identification of the destination variable to the use set;

(F) a definition set reference addition module for enabling the computer to determine, for each destination variable identified in the intermediate reference node, whether the use set identifies the destination variable and if not to enable the computer to add an identification of the destination variable to the definition set; and (G) an iteration control module for enabling the computer to operate in response to the intermediate module, the contextual definition set reference addition module and the definition set reference addition module through a series of iterations, the intermediate representation node selection module enabling the computer to select successive intermediate representation nodes in a series in successive iterations.

25. A system as defined in claim 23 in which the intermediate representation generating module enables the computer to generate the intermediate representation as a series of basic blocks and establish for each basic block a change status flag having a changed condition and an unchanged condition, the intermediate representation generating module enabling the computer to initialize each basic block's status flag to the changed condition, the definition/use set generating module further enabling the computer to condition the status flag of each basic block to the unchanged condition after establishing the definition set and the use set for each basic block.

26. A control arrangement for use in controlling a computer to facilitate generation of an object code program to be executed by a target computer, the target computer comprising a processor array comprising a plurality of processing nodes for processing data in parallel, the computer generating the object code program in response to a source code program written in a high-level language, the high-level language including a plurality of instructions, at least some of the instructions including an always variant to be executed by all of the processing nodes regardless of a context condition and a non-always variant to be executed on one of the processing nodes having a selected context condition, said control arrangement comprising:

(a) an intermediate representation generating module for enabling the computer to generate an intermediate representation in response to the source code program the intermediate representation having a series of intermediate representation nodes representative of source code instructions, at least some intermediate representation nodes each including at least one variable used as a referenced variable and at least some intermediate representation nodes each including at least one variable used as a destination variable;

(b) a definition/use set generating module for enabling the computer to generate, in response to the intermediate representation, a definition set and a use set, the use set identifying those variables which are first used in the intermediate representation node series as (i) referenced variables in any intermediate representation nodes or (ii) destination variables in intermediate representation nodes representing non-always instruction variants, and the definition set identifying those variables which are otherwise first used in the intermediate representation node series as destination variables; and (c) an optimization module for enabling the computer to generate an optimized intermediate representation in response to the intermediate representation and the definition set and the use set.

27. A control arrangement as defined in claim 26 in which the definition/use set generating module comprises:

(A) a definition set and use set establishment module for enabling the computer to initialize a definition set and a use set for variables in the intermediate representation;

(B) an intermediate representation node selection module for enabling the computer to select an intermediate representation node;

(C) a use set reference addition module for enabling the computer to determine, for each variable which is a reference variable in the selected intermediate representation node; whether the definition set identifies the variable and if not to enable the computer to add an identification of the variable to the use set;

(D) an instruction type determination module for enabling the computer to determine whether the instruction represented by the selected intermediate representation node is a non-always variant;

(E) a contextual definition set reference addition module for enabling the computer to, in response to a determination that the instruction represented by the selected intermediate representation node is a non-always invariant, whether the definition set identifies the destination variable and if not to enable the computer to add the identification of the destination variable to the use set;

(F) a definition set reference addition module for enabling the computer to determine, for each destination variable identified in the intermediate reference node, whether the use set identifies the destination variable and if not to enable the computer to add an identification of the destination variable to the definition set; and (G) an iteration control module for enabling the computer to operate in response to the intermediate representation node selection module, the use set reference module, the instruction type determination module, the contextual definition set reference addition module and the definition set reference addition module through a series of iterations, the intermediate representation node selection module enabling the computer to select successive intermediate representation nodes in the series in successive iterations.

28. A control arrangement as defined in claim 26 in which the intermediate representation generating module enables the computer to generate the intermediate representation as a series of blocks and establish for each block a change status flag having changed a condition and an unchanged condition, the intermediate representation generating module enabling the computer to initialize each block's status flag to the changed condition, the definition/use set generating module further enabling the computer to condition the status flag of each block to the unchanged condition after establishing the definition set and the use set for each block.

* * * * *